April 17, 1962

KENZO HOSHINO 3,030,152

APPARATUS FOR TRANSPORTING A SOLID-LIQUID
MIXTURE BY ROTATING PIPE

Filed Dec. 7, 1959

Inventor:
Kenzo Hoshino by: Michael J. Striker
Attorney

3,030,152
APPARATUS FOR TRANSPORTING A SOLID-LIQUID MIXTURE BY ROTATING PIPE
Kenzo Hoshino, 1532 Suga, Hiratsuka City,
Kanagawa Perfecture, Japan
Filed Dec. 7, 1959, Ser. No. 857,638
Claims priority, application Japan Dec. 8, 1958
3 Claims. (Cl. 302—14)

This invention relates to an apparatus for transporting a mixture of particulated solid material and a liquid. More particularly, the invention relates to an arrangement for transporting the solid-liquid mixture by means of rotating pipes, which are rotated by a motor and transmission connecting the motor to the pipes.

Up to the present time, solid-liquid mixtures have been transported and pumped in fixed pipes, but by such an arrangement the mixtures are difficult to transport in a long pipe line, since the solid material tends to sediment, and such sediment tends to choke the pipe line preventing further transportation of the mixture. The difficulty of transporting a solid-liquid mixture through stationary pipes depends upon the rate of sedimentation of the solid material in the mixture and it is therefore not possible to prevent the choking in the pipe by increasing the capacity or power of the pump connected thereto.

As a result of my research I found that a choking in the pipe will not occur until a certain amount of sedimentation has been settled on the inner pipe surface and remains fixed thereto so that it will gradually build up to completely choke the interior of the pipe.

It is an object of the present invention to overcome this difficulty encountered in transporting a solid-liquid mixture through pipes and to provide for an apparatus in which transportation of such a mixture through the pipe can be effected without choking the interior of the pipe.

I have found that the difficulty can be overcome by simply rotating the pipe about its axis so as to continuously move any sedimentation forming in the interior of the pipe relative to the inner pipe surface whereby choking of the pipe will be avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
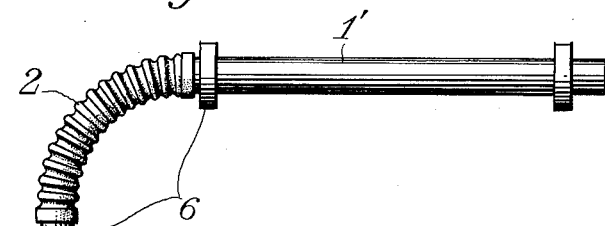
FIGURE 1 is a side view of the apparatus of the present invention.
Figure 2A:
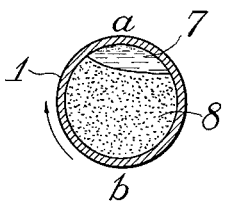
FIGURE 2a and FIGURE 2b are cross sections through the pipe shown in FIGURE 1 and illustrating schematically the relative rotary movement of the pipe and the solid-liquid mixture transported therethrough.
Figure 2B:
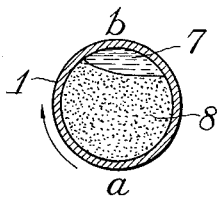

Referring now to the drawing and more particularly to FIGURE 1 of the same, it will be seen that the apparatus of the present invention includes pipe means formed by a pair of rigid pipes 1, 1' which extend at an angle with respect to each other and which are connected to each other by a flexible pipe 2. As shown in FIGURE 1 the pipe section 1' extends in substantially horizontal direction whereas the pipe 1 extends substantially normal to pipe 1'. As shown in the cross section of FIGURES 2a and 2b the pipe means have inner surface defining a free and uninterrupted inner space. The pipe sections 1 and 1' are mounted for rotation about their axes on bearings 6.

Connected to the lower end of the rigid pipe section 1 is a pump 4 which pumps a mixture of solid particles, such as coal, sand or the like and a liquid through the pipe means formed by the pipe sections 1, 2 and 1'. Pipe 1 is rotated about its axis by a motor 3 connected to the pipe 1 by a gear transmission 5 and the rotation of pipe section 1 is transmitted to the pipe section 1' through the flexible pipe section 2. The flexible pipe section 2 is used intermediate pipe sections 1 and 1' so that the direction of the pipe line may be changed. The rotational speed of the pipe section produced by the motor 3 and the gear transmission 5 is decided according to the sedimentation rate of the mixture and independent of the flow velocity produced by the pump 4.

The operation of the arrangement described above will be evident from the description. A solid-liquid mixture is pumped through the pipe means 1, 2 and 1' while the pipe 1 is rotated about its axis by the motor 3 and the gear transmission 5, which rotation is transmitted to the pipe section 1' by the flexible pipe section 2. As can be seen from FIGURES 2A and 2B, during such rotation even if sedimentation between the solid particles 8 and the liquid 7 will occur, the sedimented particles 8 will constantly move relative to the inner pipe surface, as schematically illustrated in these two figures in which reference symbols a and b respectively designate the rear and front portion of the pipe section 1 as viewed in FIGURE 1. Due to this relative rotary movement of any sedimentation with respect to the inner pipe surface choking of the pipe interior during transportation of a solid-liquid mixture therethrough is positively prevented.

It is understood that in long pipe lines a plurality of pipe units 1, 2, 1' as shown in FIGURE 1 may be connected by couplings.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Arrangement for transporting a mixture of particulated solid material and a liquid comprising, in combination, pipe means having an inner surface defining a free and uninterrupted inner space, said pipe means including a section extending in a substantially horizontal direction; pump means communicating with said pipe means for pumping a mixture of particulated solid material and liquid through said inner uninterrupted space of said pipe means; and means operatively connected to said substantially horizontal section of said pipe means for rotating the same about its axis to cause relative movement in circumferential direction between said inner surface of said section and said mixture to prevent thereby sedimentation of said particulated solid material which would gradually lead to a choking of said section.

2. Arrangement for transporting a mixture of particulated solid material and a liquid comprising, in combination, pipe means comprising at least two rigid pipe sections extending transverse to each other and one of which extends in substantially horizontal direction, at least one flexible pipe section connecting said rigid pipe sections, bearing means mounting said rigid pipe sections for rotation about their axes, each of said sections having an inner surface defining a free and uninterrupted inner space; pump means communicating with said pipe means for pumping a mixture of particulated solid material and liquid through said inner uninterrupted space of said pipe means; and means operatively connected to one of said rigid pipe sections to rotate thereby said substantially horizontal pipe section about its axis to cause relative movement in circumferential direction between said inner surface of said section and said mixture to prevent thereby sedimentation of said particulated solid material which would gradually lead to a choking of said section.

3. Arrangement for transporting a mixture of particulated solid material and a liquid comprising, in combination, pipe means comprising at least two rigid pipe sections extending transverse to each other and one of which extends in substantially horizontal direction, at least one flexible pipe section connecting said rigid pipe sections, bearing means mounting said rigid pipe sections for rotation about their axes, each of said sections having an inner surface defining a free and uninterrupted inner space; pump means communicating with said pipe means for pumping a mixture of particulated solid material and liquid through said inner uninterrupted space of said pipe means; a drive motor; a pinion operatively connected to said drive motor to be driven thereby; and a gear meshing with said pinion and arranged coaxially with and fixed to one of said rigid pipe sections to rotate thereby said substantially horizontal pipe section about its axis to cause relative movement in circumferential direction between said inner surface of said section and said mixture to prevent thereby sedimentation of said particulated solid material which would gradually lead to a choking of said section.

References Cited in the file of this patent

UNITED STATES PATENTS

| 2,045,757 | Constantin | June 30, 1936 |
| 2,680,084 | Ryan | June 1, 1954 |

FOREIGN PATENTS

| 1,170,511 | France | Sept. 22, 1958 |